A. GETZSCHMANN.
Device for Stopping Runaway Horses.
No. 217,606. Patented July 15, 1879.
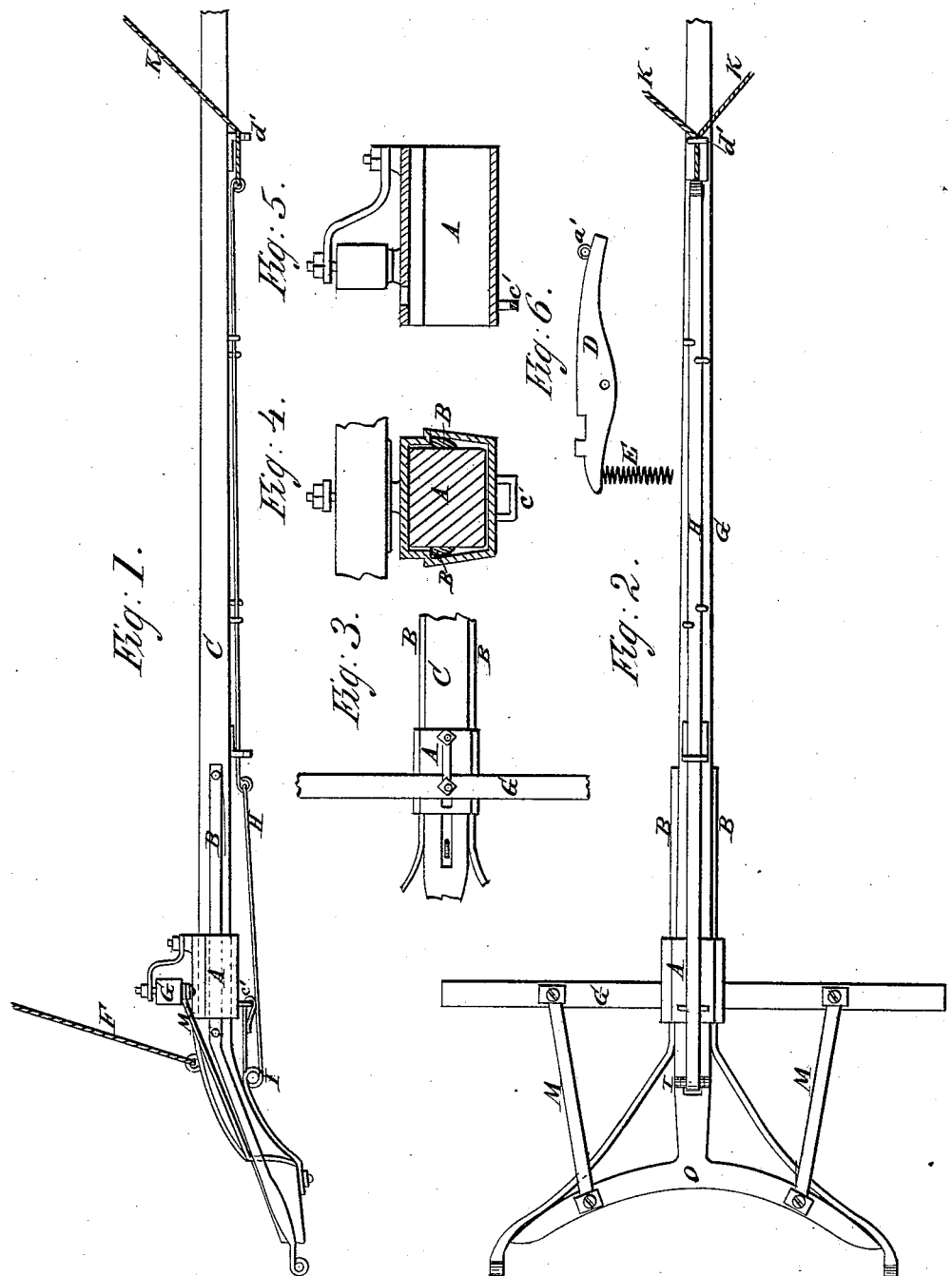
WITNESSES:
Achilles Schehl.
C. Sedgwick
INVENTOR:
A. Getzschmann
BY
ATTORNEYS.

UNITED STATES PATENT OFFICE

AMANDUS GETZSCHMANN, OF OMAHA, NEBRASKA, ASSIGNOR OF ONE-THIRD HIS RIGHT TO WERNER BOEHL, OF SAME PLACE.

IMPROVEMENT IN DEVICES FOR STOPPING RUNAWAY HORSES.

Specification forming part of Letters Patent No. 217,606, dated July 15, 1879; application filed April 29, 1879.

*To all whom it may concern:*

Be it known that I, AMANDUS GETZSCHMANN, of Omaha, in the county of Douglas and State of Nebraska, have invented a new and Improved Device for Stopping Runaway Horses, of which the following is a specification.

Figure 1 is a side elevation of the device. Fig. 2 is a plan of the under side of the device. Fig. 3 is a plan of the sleeve and a section of the pole. Fig. 4 is a sectional elevation of the sleeve. Fig. 5 is a side elevation of the same. Fig. 6 is a side elevation of the spring and hook.

Similar letters of reference indicate corresponding parts.

The object of this invention is to provide a simple and effective device for stopping runaway horses, that may be applied to the pole of any wagon or carriage.

The invention consists of the movable sleeve A, sliding on two guide-rails, B B, that project about three-eighths of an inch from the surfaces of the sides of the carriage or wagon pole C.

The sleeve is held in position by the stout hook D, that is pivoted in a slot in the pole, and whose hooked end is forced upward by the spring E to engage in the corresponding hole in the sleeve. This hook is also provided with an eye or ring, a', to which a strap or line, F, is attached, by pulling on which the hook is disengaged from the sleeve. This strap is led to the seat of the driver, so that he can at any moment unhook the sleeve and allow it to slide freely on the pole. The whiffletree G is pivoted at its center on this sleeve, and has its ends connected with the cross-bow O by elastic bands or straps M M.

The under side of the sleeve is provided with an eye or loop, C', to which is made fast one end of a long strap, H, that is led rearward and turned over the roller I, and thence forward along the under side of the pole to a point about six inches behind the breasts of the horses, where it connects with the bit-straps K K, that run through the ring d', and through rings attached to the collars, and thence to the bits.

Should the horses attempt to run away, the driver will pull the line F, the sleeve is unhitched and slides forward, and the strap H is drawn in the opposite direction, causing the bit-straps to operate on the bits and bring the horses to a stand-still; and if the horses then step backward, the elastic straps M M serve to draw the sleeve back again, so that the driver may, by pulling on the line F, reconnect the sleeve and hook.

On leaving a wagon and horses without a driver in the street, the sleeve may be unhitched in the manner described, when any attempt of the horses to move forward will be promptly met by the action of the straps and bits, and consequently they will be unable to advance more than two or three steps.

The drawings herewith represent the device applied to a two-horse wagon or carriage; but it is obvious that it can be as easily adapted to vehicles drawn by one horse, and with equally good effect.

Having thus described my invention, I claim as new and desire to secure by Letters Patent—

1. The within-described device, consisting of the sleeve A, provided with loop c', guide-rails B B, hook D, provided with eye a' and spring E, strap F, whiffletree G, elastic straps M M, strap H, roller I, bit-straps K K, and ring d', substantially as herein shown and described.

2. The sleeve A, in combination with the hook D and spring E, substantially as herein shown and described.

3. The whiffletree G and elastic straps M M, in combination with the sleeve A, substantially as herein shown and described.

4. The strap H, in combination with the sleeve A, loop c', and roller I, substantially as herein shown and described.

AMANDUS GETZSCHMANN.

Witnesses:
GUST. BENEKE,
PAUL FERTUT.